United States Patent
Usoskin

(10) Patent No.: US 8,369,912 B2
(45) Date of Patent: Feb. 5, 2013

(54) SUPERCONDUCTING CABLE

(75) Inventor: Alexander Usoskin, Hoesbach (DE)

(73) Assignee: Bruker HTS GmbH, Hanau (DE)

( * ) Notice: Subject to any disclaimer, the term of this patent is extended or adjusted under 35 U.S.C. 154(b) by 735 days.

(21) Appl. No.: 12/458,261

(22) Filed: Jul. 7, 2009

(65) Prior Publication Data
US 2010/0099571 A1  Apr. 22, 2010

(30) Foreign Application Priority Data

Jul. 9, 2008 (EP) ..................... 08012411

(51) Int. Cl.
*H01B 12/02* (2006.01)
(52) U.S. Cl. ....... 505/230; 174/125.1; 29/599; 505/704; 505/231
(58) Field of Classification Search .......... 505/230, 505/231, 237, 238, 430, 431, 704, 163, 850; 174/125.1, 15.4, 15.5; 29/599
See application file for complete search history.

(56) References Cited

U.S. PATENT DOCUMENTS

| 6,253,096 | B1 * | 6/2001 | Balachandran et al. ...... 505/231 |
| 2004/0000421 | A1 | 1/2004 | Reis |
| 2004/0200637 | A1 * | 10/2004 | Yumura et al. ............. 174/125.1 |
| 2005/0056456 | A1 * | 3/2005 | Ladie' et al. ............... 174/125.1 |
| 2009/0093370 | A1 * | 4/2009 | Kobayashi et al. ........... 505/211 |

FOREIGN PATENT DOCUMENTS

| DE | 1564701 B | * | 1/1975 |
| EP | 0 623 937 | | 11/1994 |
| EP | 1 467 382 | | 10/2004 |
| JP | 04-324209 A | * | 11/1992 |
| JP | 2005 085612 | | 3/2005 |
| WO | WO 2008093883 | * | 8/2008 |

OTHER PUBLICATIONS

Tackacs, "Low coupling losses in YBa2Cu3O7 coated conductors with current sharing between the superconductor stripes," Appl. Phys. Lett. 2007, V90, 242505.*
Takács, S. "Low coupling losses in YBa2Cu3O7 coated conductors with with current sharing between the superconducting stripes", Applied Physics Letters, AIP, American Institute of Physics, Melville, NY, vol. 90, No. 24, Jun. 13, 2007 pp. 242505-242505.

* cited by examiner

*Primary Examiner* — Stanley Silverman
*Assistant Examiner* — Kallambella Vijayakumar
(74) *Attorney, Agent, or Firm* — Paul Vincent

(57) ABSTRACT

A superconducting cable (1; 10; 30) has a channel (4, 38) for a cooling liquid, a tubular support structure (5, 37), at least two layers (2, 3; 11-15; 31, 32, 35, 36) comprising high Tc conductors (2a, 3a) which comprise a high Tc material, and an insulation (7, 17), in particular a tubular insulation (7). The conductors (3a) of the outer layer (3; 13-15; 33, 36) comprise a first high Tc material that is different from a second high Tc material of the conductors (2a) of the inner layer (2; 11-12; 32, 35), wherein the first high Tc material exhibits lower AC losses as compared the second high Tc material, and that the high Tc conductors (3a) of the outer layer (3; 13-15; 33, 36) comprise normal-conducting interruptions (41, 42, 43). The superconducting cable exhibits reduced AC losses.

11 Claims, 4 Drawing Sheets

SUPERCONDUCTING CABLE

This application claims Paris Convention priority of EP 08 012 411.8 filed Jul. 9, 2008 the complete disclosure of which is hereby incorporated by reference.

BACKGROUND OF THE INVENTION

The invention relates to a superconducting cable, comprising a channel for a cooling liquid, a tubular support structure, at least two layers comprising high Tc conductors which comprise a high Tc material, and an insulation, in particular a tubular insulation.

Such a superconducting cable is known from EP 0 623 937 A2, for example.

Superconducting cables are aimed for transporting large currents with a minimum of losses. In general, superconducting cables offer superconducting current paths with a vanishing ohmic resistance. The superconductor material used in superconducting cables must be cooled cryogenically, though. In practice, superconductor materials with a high critical temperature (Tc) are preferred for superconducting cables, such that cooling is possible with inexpensive liquid nitrogen.

However, when transporting alternating current (AC) through a superconducting cable, there will still occur some losses due to eddy currents within the conductors.

S. Takács in Appl. Phys. Lett. 90, 1 (2007), article No. 077724, has found low coupling losses in striated YBCO coated conductors divided by insulating layers and covered with connecting perpendicular, normally conducting metal segments.

It is the object of the invention to provide a superconducting cable exhibiting reduced AC losses, which, accordingly, result in an increased efficiency in the transportation of AC currents through the superconducting cable.

SUMMARY OF THE INVENTION

This object is achieved, in accordance with the invention, by a superconducting cable as described in the beginning, characterized in that the conductors of the outer layer comprise a first high Tc material that is different from a second high Tc material of the conductors of the inner layer, wherein the first high Tc material exhibits lower AC losses as compared the second high Tc material, and that the high Tc conductors of the outer layer comprise normal-conducting interruptions.

Superimposing of the two features mentioned above, namely, the usage of two different high Tc materials with different AC losses in different layers of the same cable, together with employment of interruptions of the continuity of the superconducting tape or wire (conductor) across its length allows to ensure a considerable reduction of AC losses, and thus to provide an improved efficiency of AC current/power transportation through the superconducting cable. The inventive improvement is rather surprising since the reduction of the AC losses is provided under increased "ohmic" resistance of the superconducting cable, as there is an additional contribution to the cable resistance originating from the normal conducting interruptions. One may interpret this improvement effect in terms of partial interruptions of eddy currents within each high Tc conductor due to normal conductivity of the interruptions at conditions where AC current is more "pressed" to the outer layer due to the skin-effect.

In some more detail, the invention proposes to use different high Tc materials within the superconducting cable, namely within different layers comprising the high Tc conductors (Note that the term "conductor" here refers to a wire or tape, and a layer typically comprises a plurality of conductors located at the same radius within the cable). A first material which exhibits comparably low AC losses is used at the outer layer (or some outer layers). A second material which exhibits comparably higher AC losses is used at the inner layer (or some inner layers). Since the currents, and in particular AC currents, concentrate on the outside of a current path, AC currents concentrate in the first material, where AC losses are less severe.

Further, the invention proposes to introduce normal conducting interruptions within the conductors of the outer layer (or some outer layers). In other words, the superconducting path within each conductor of the outer layer (or the outer layers) is broken, typically with a regular spacing of the interruptions. The interruptions prevent the formation of far extending eddy current loops based on superconductivity within the conductors, what reduces AC losses. The non-superconducting interruptions introduce some current transport losses, too, but typically these losses turn out to be considerably smaller than the avoided AC losses due to eddy currents. To this end, the number and spacings of the normal-conducting interruptions may be optimized with respect to the total cable losses, also in view of the respective contributions of the inner and outer layers to the total AC current at a selected frequency.

In accordance with the invention, the layers are typically helically wound on the support structure, and on top of each other. In between the support structure and the layers an intermediate structure comprising e.g. normally conducting tapes may be employed. The terms "inner" and "outer" refer to the radial position of a layer within the cable, which is typically basically axially symmetric. When there are more than two layers (in particular within a line, i.e. within layers of a particular direction of current transport), there may be two or more outer layers and/or two or more inner layers. Note that by a larger number of layers, the overall current transport capacity of the cable may be increased.

In a preferred embodiment of the inventive superconducting cable, the normal-conducting interruptions in a high Tc conductor are separated by a distance of between 2 m to 40 m. Typically, the separation of the interruptions in a conductor is periodic. The above mentioned distance intervals have been found to offer good protection from eddy currents while still keeping losses (due to normal conducting interruptions) low with typical AC frequencies used with superconducting cables.

In a further embodiment, each of the normal-conducting interruptions comprises an electrical bridge jointed to high Tc conductor parts through a contacting layer of normal metal. Note that normal metal means normally conducting (non-superconducting) metal.

In a preferred further development of this embodiment, the contacting layer of normal metal comprises Ag, In, Cd, Bi, Zn, Pb and/or alloys based on these components. These components have been proven in practice.

In another further development of the above embodiment, the electrical bridge comprises normal metal or/and additional high Tc material.

Preferred is further an embodiment wherein the conductors of the outer layer are coated conductors. Note that the coated conductors preferably have a steel substrate. In a further development of this embodiment, the first high Tc material is $ReBa_2Cu_3O_{7-x}$, with Re being Y or a rare earth element, in particular wherein the first high Tc material is YBCO. X is a correction factor of the oxygen index varying from 0.05 to 0.8.

Another embodiment provides that the second high Tc material is BSCCO, in particular Bi-2223. Note that typically the conductors of the inner layer are multifilament wires.

In a highly preferred embodiment of the inventive superconducting cable, the channel is filled with liquidized cryogenic gas as the cooling liquid. Typical cooling liquids include liquid $N_2$ and $Ne_2$, or even He. Note that the channel can be realised as a cavity at the core of the cable, and/or as a ring shaped cavity, typically surrounding the layers.

In another preferred embodiment, the superconducting cable comprises coaxial forward and return lines or three-phase lines, with each line comprising at least two layers with an outer layer and an inner layer according to claim 1. Forward and return (phase) indicate the phase of current flow in the related layers here. This setting introduces an inherent shielding of the superconducting cable.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DESCRIPTION OF THE PREFERRED EMBODIMENT

The present invention relates to a superconducting cable aimed for an electrical power transmission (transportation) of alternating current (AC). Such a superconducting cable may be used, in particular, with electrical transformers, ac fault current limiters, superconducting power devices for phase correction, and many more. Preferably, the invention may be used at standard AC frequencies such as 50 to 60 Hz; nevertheless, it may be also employed at higher frequencies, in particular at about 400 Hz, and even in the RF (radio frequency) range (100 kHz to 100 GHz).

Figure 1:
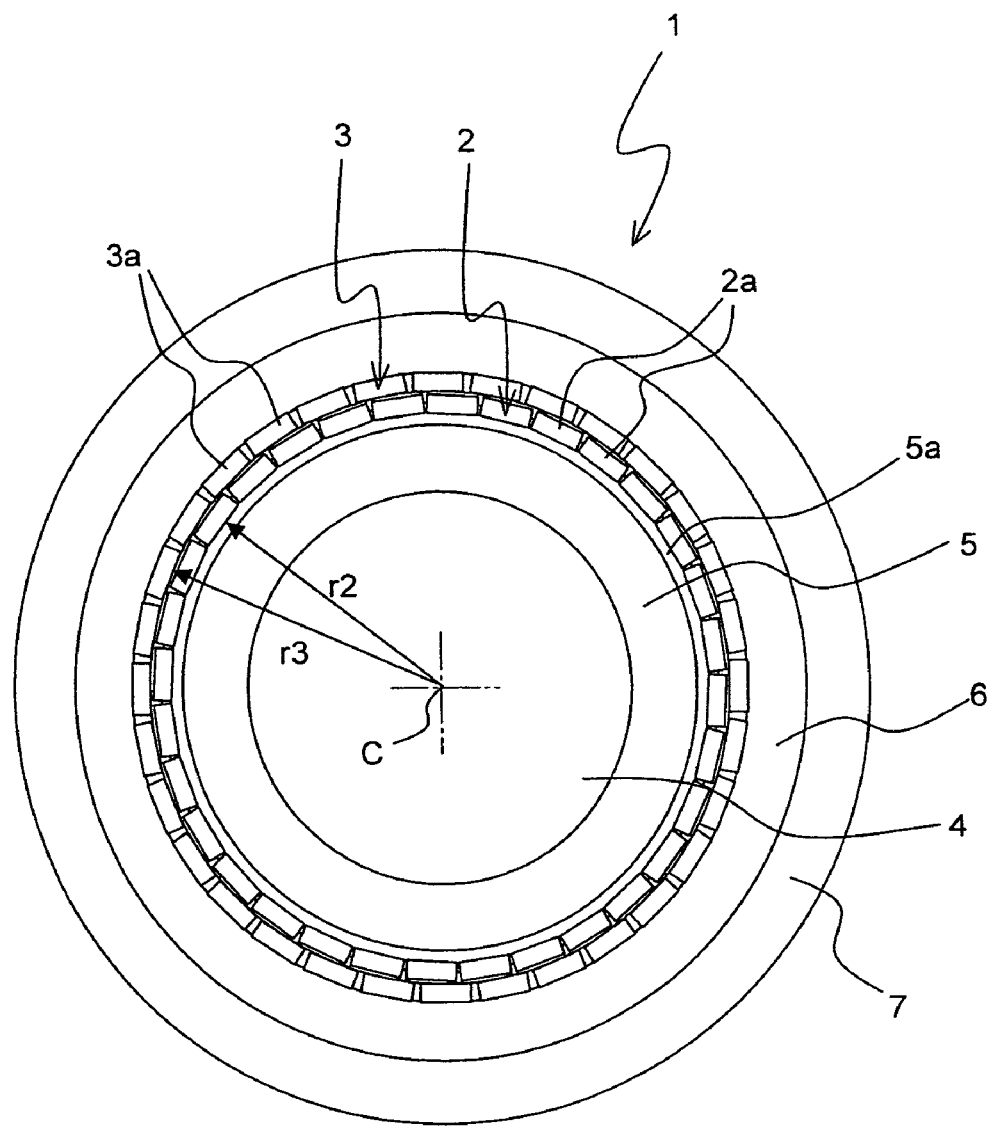
FIG. 1 shows a schematic cross section of a first embodiment of an inventive superconducting cable, with two layers.
Figure 4:
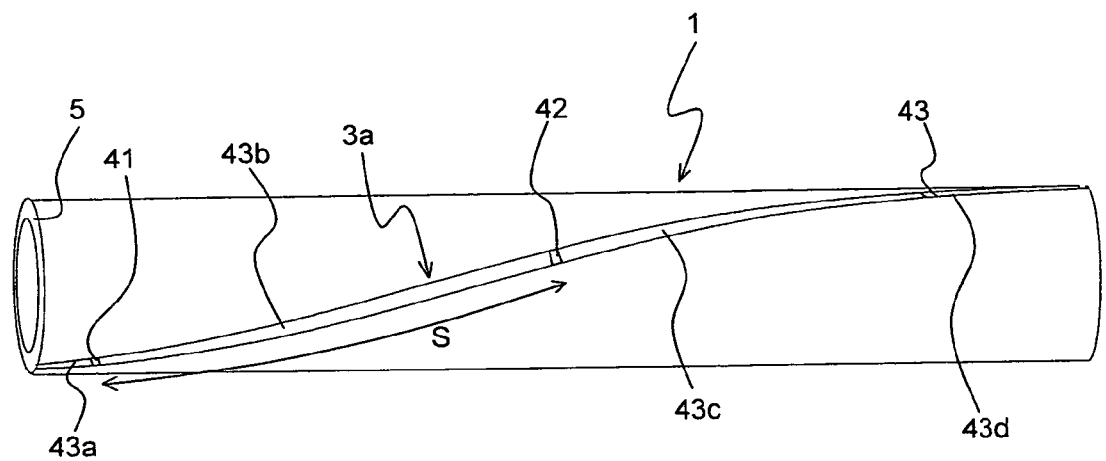
FIG. 4 shows a schematic side view of a part of the first embodiment, including normal conducting interruptions within one conductor.

FIG. 1 shows a first embodiment of an inventive superconducting cable 1 in a schematic cross-section, perpendicular to the cable axis along which the cable structure is basically invariant (note the twist illustrated in FIG. 4, though).

The cable 1 comprises two layers 2, 3 of conductors 2a, 3a with a high Tc (critical temperature, below which the conductor has superconductive properties). Note that preferably Tc of all conductors 2a, 3a, in accordance with the invention, is above 77 K. The conductors 2a of the inner layer 2, here a number of 32 conductors 2a, are all arranged in a ring shape on the same radius r2 of the cable 1 with respect to the cable center C, with respect to which the cable 1 is basically axially symmetric. The conductors 3a of the outer layer 3 are correspondingly all on the same radius r3, with r3>r2.

The conductors 3a of the outer layer 3 are here tapes, namely coated conductors with a stainless steel substrate on which YBCO has been deposited. So YBCO acts as the first high Tc material. Note that the conductors 3a of the outer layer have interruptions (see FIG. 4). The conductors 2a of the inner layer 2 are here multifilament wires comprising BSCCO filaments. So BSCCO acts as the second high Tc material. Note that YBCO exhibits lower AC losses than BSCCO, and therefore has been arranged farther outside. The conductors 2a, 3a of the layers 2, 3 here belong all to the same electric line, i.e. they guide current with the same current flow direction in parallel.

The conductors 2a of the inner layer 2 are wound on a tubular support structure 5 made of a dielectric material. The support structure 5 is flexible to allow some bending of the cable 1 (as long as it is not at cryogenic temperature). In the embodiment shown, between the support structure 5 and the inner layer 2, there is arranged some shunt metal element 5a, such as a copper foil.

The interior of the tubular support structure 5 acts as a channel 4 for a coolant, such as liquid $N_2$, which can be pumped through the channel in order to cool the layers 2, 3. The coolant makes the high Tc materials in the conductors 2a, 3a superconductive.

On top of the inner layer 2, the outer layer 3 is wound. Beyond the outer layer 3, there is some free space 6 which can be used as another or an alternative channel for a cooling liquid, or for arranging some more stabilizing structures.

Beyond the free space 6, as the outermost part of the cable 1, there is a thermal insulation 7, here a tubular dewar structure. The dewar structure comprises an inner and outer wall, typically made of sheet metal.

The efficiency of a superconducting cable with a design similar to embodiment of FIG. 1 has been determined by a calculation based on experimentally measured AC losses in singe superconducting tapes of different art. The cable structure comprises 15 tapes of BiSCCO in the first (inner) layer, each tape with a width of 4.1 mm and thickness of 0.21 mm, and 15 tapes of YBCO in the second (outer) layer, each tape with a width of 4.0 mm and thickness of 0.15 mm, each tape is Cu plated with a plating thickness of 0.025 mm. AC losses are 37% lower as compared to a cable consisting of layers made of the same material (either YBCO or BSCCO) without interruptions. By an AC current of 923 A rms, which corresponds to 60% of the total critical current (1538 A rms), the inventors achieved with the suggested inventive design AC losses of 250 mW/m.

Figure 2:
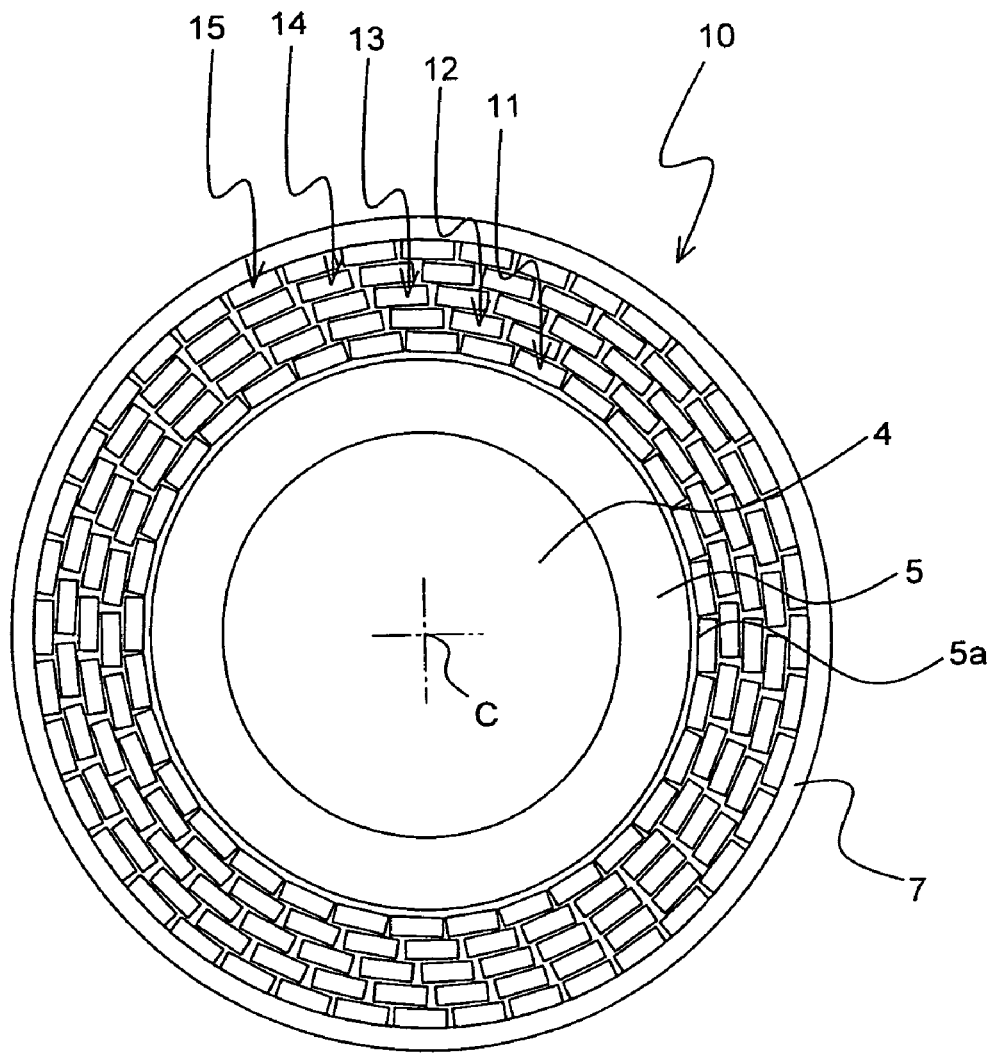
FIG. 2 shows a schematic cross section of a second embodiment of an inventive superconducting cable, with five layers.

FIG. 2 shows a second embodiment of an inventive superconducting cable 10.

It comprises altogether five layers 11-15 of high Tc conductors. The two innermost layers 11 and 12 comprise conductors of BSCCO and can be considered as inner layers in accordance with the invention, whereas the three outermost layers 13, 14 and 15 comprise YBCO and can be considered as outer layers in accordance with the invention. Further, the cable 10 comprises a tubular dielectric support structure 5 and a shunt metal element 5a again, on which the layers 11-15 are supported. The cavity within the support structure 5 acts as a channel 4 for a coolant again. The outermost layer 15 is covered with a dielectric insulation 7, which comprises here thick plastic tapes (not shown in detail).

When AC current is transported through the layers 11-15, the layers farther away from the center C experience a higher current amplitude. In accordance with the invention, these outer layers 13, 14 and 15 comprise YBCO material which exhibits relatively low AC losses. For the inner layers 11 and 12, BSCCO is used which exhibits higher AC losses, but here the AC current amplitudes are lower. By using two different high Tc materials in the conductors of different layers, and arranging them in accordance with the invention at different radii, the inventors have found a beneficial effect on the overall AC losses of the cable 10.

Figure 3:
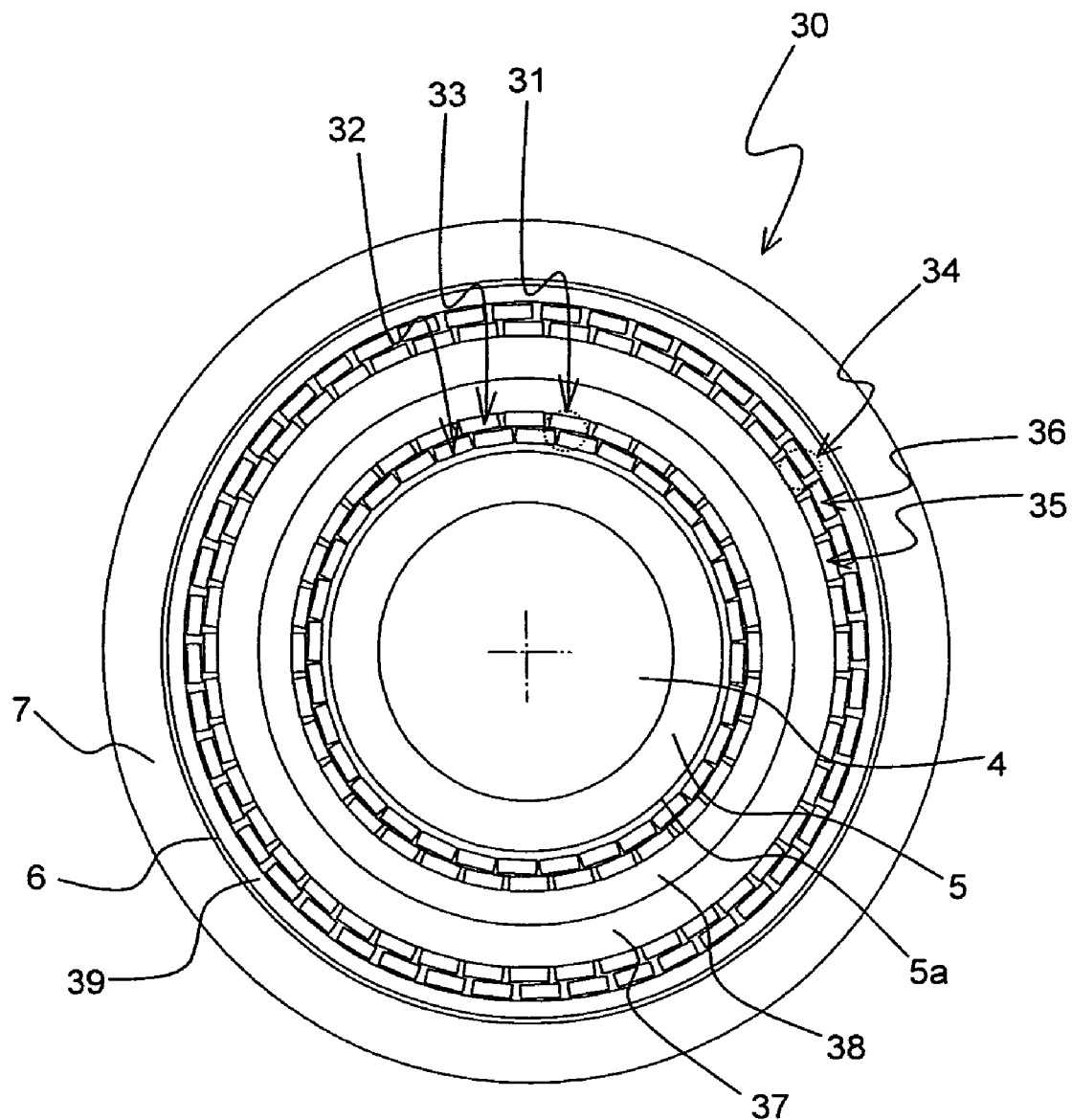
FIG. 3 shows a schematic cross section of a third embodiment of an inventive superconducting cable, with two lines each comprising two layers.

FIG. 3 shows a further embodiment of an inventive superconducting cable 30. As the particularity of this embodiment, there are two separated (and electrically isolated) sets of neighboring layers, with each set representing a line with layers that transport current in parallel (with the same direction of the current). In the example shown, there is a forward line 31 comprising an inner layer 32 and an outer layer 33, and a return line 34 comprising an inner layer 35 and an outer layer 36. When in use, the current flow in the return line 34 is opposite to the current flow in the forward line 31.

In the forward line 31, the inner layer 32 comprises BSCCO material (second material with relatively high AC losses), and the outer layer 33 comprises YBCO material (first material with relatively low AC losses) and interruptions at different positions along the conductors of the outer layer 33.

In the return line 34, the inner layer 35 comprises BSCCO material (second material with relatively high AC losses), and the outer layer 36 comprises YBCO material (first material with relatively low AC losses) and interruptions at different positions along the conductors of the outer layer 36.

Therefore, within each line (or set of layers) 31, 34, the benefits of the invention can be used again.

The cable 30 further comprises two dielectric support structures 5 and 37, with a shunt metal element 5a again. Note that a shunt metal element is not necessary below the inner layer 35 of the return line 34. Further, there are two channels 4 and 38 for a cooling liquid (e.g. with a forward and backward coolant flow). The outer layer 36 of the return line 34 is covered with a dielectric tape 39, followed by a narrow, ring-shaped free space 6 and a thermal insulation 7, here a dewar structure again. The insulation 7 is here a cryogenic envelope.

FIG. 4 illustrates conductors (shown here for simplification is just one conductor 3a and a support structure 5) of an outer layer in accordance with the present invention, in a schematic side view, compare also FIG. 1. All conductors (including those of inner layers) are generally laid under a non-zero angle relatively the axis of the supporting structure 5 along the cable 1 (i.e. wound helically around the cable axis). However, the typical axial length of one laying period (along the cable axis direction) is on the order of meters. In FIG. 4, about half of one laying period is shown with conductor 3a.

As a particularity of conductors of an outer layer, each conductor 3a exhibits periodic normal-conducting interruptions 41, 42, 43 along its axial extension, in accordance with the invention, which actually separates the conductor 3a into a plurality of conductor parts 43a-43d. The separation distance S of two neighboring interruptions 41, 42 (measured along the conductor 3a) is typically on the order of a few meters; note that the distance S may be optimized with respect to the intended AC current frequency.

The interruptions prevents establishing of superconducting current loops beyond the edges of a conductor part 43a-43d, and therefore reduce and limit the possible overall size of such loops.

Interruptions 41-43 are established in each conductor 3a of an outer layer; the axial positions of these interruptions may be randomly distributed among the different conductors of a layer, or may be chosen at identical axial positions for all conductors of one layer, if desired.

Figure 5:
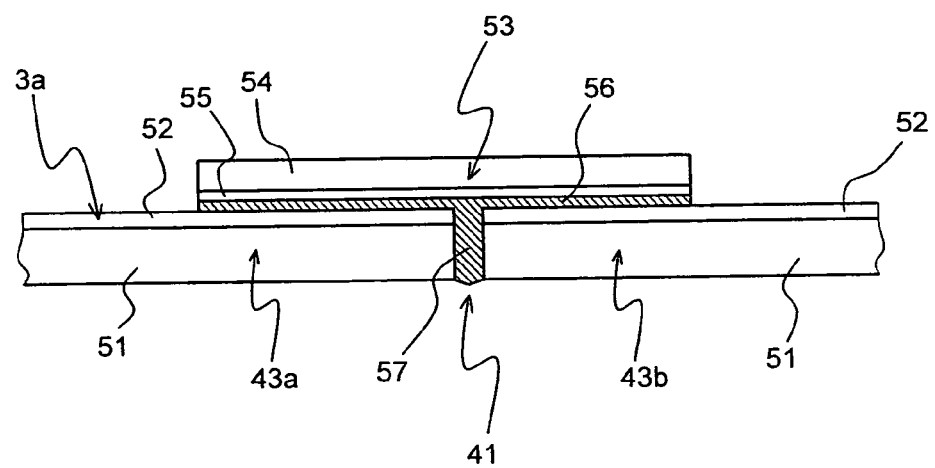
FIG. 5 shows a schematic cross-sectional view of an electrical bridge jointed to two conductor parts, in accordance with the invention.

FIG. 5 illustrates, as a detail illustration of the conductor 3a of FIG. 4, an interruption 41 at the opposing ends of two conductor parts 43a, 43b of the same conductor 3a. The conductor parts 43a, 43b each comprise a steel substrate 51 and a covering film 52 of high Tc material (here YBCO). Across the gap 57 between the conductor parts 43a, 43b, on the top side of the covering films 52, an electrical bridge 53 is jointed. The bridge 53 here comprises a metal substrate 54 and a covering film 55 of high Tc material, and is affixed to the conductor parts 43a, 43b by means of a contacting layer 56 of normal (non-superconducting) metal, such as silver (Ag). The contacting layer 56 here also connects the two substrates 51 in the region of the gap 57.

I claim:

1. A superconducting cable comprising:
   means for defining a channel, said channel suitable for transporting a cooling liquid;
   a tubular support structure;
   an insulation layer or a tubular insulation layer;
   an outer superconductor layer containing a first high Tc conductor material having first AC losses;
   an inner superconductor layer containing a second high Tc conductor material which differs from said first high Tc material of said outer layer, said second high Tc material having second AC losses which exceed said first AC losses of said outer layer; and
   normal-conducting interruptions disposed in said first high Tc conductor material of said outer layer.

2. The superconducting cable of claim 1, wherein said normal-conducting interruptions in said first high Tc conductor are separated by a distance of between 2 m to 40 m.

3. The superconducting cable of claim 1, wherein said normal-conducting interruptions comprises an electrical bridge jointed to first high Tc conductor parts through a contacting layer of normal metal.

4. The superconducting of claim 3, wherein said contacting layer of normal metal comprises Ag, In, Cd, Bi, Zn, Pb and/or alloys based on these components.

5. The superconducting cable of claim 3, wherein said electrical bridge further comprises additional high Tc material.

6. The superconducting cable of claim 1, wherein said first conductor of said outer layer is a coated conductor.

7. The superconducting cable of claim 1, wherein said first high Tc material is $ReBa_2Cu_3O_{7-x}$, with Re being Y or a rare earth element.

8. The superconducting cable of claim 7, wherein said first high Tc material is YBCO.

9. The superconducting cable of claim 1, wherein said second high Tc material is BSCCO.

10. The superconducting cable of claim 1, wherein said channel is filled with liquidized cryogenic gas as the cooling liquid.

11. The superconducting cable of claim 1, further comprising coaxial forward and return lines or three-phase lines, wherein each line comprises at least two layers with said outer layer and said inner layer.

* * * * *